March 14, 1972  A. F. JOHNSON  3,649,480
METHOD OF WITHDRAWING HEAT AND CURRENT FROM MOLTEN
ALUMINUM CATHODE ELECTROLYTIC CELLS
Original Filed Jan. 4, 1967
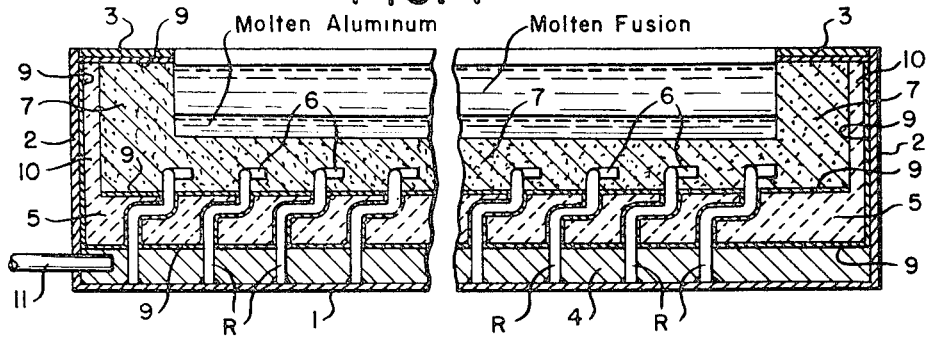
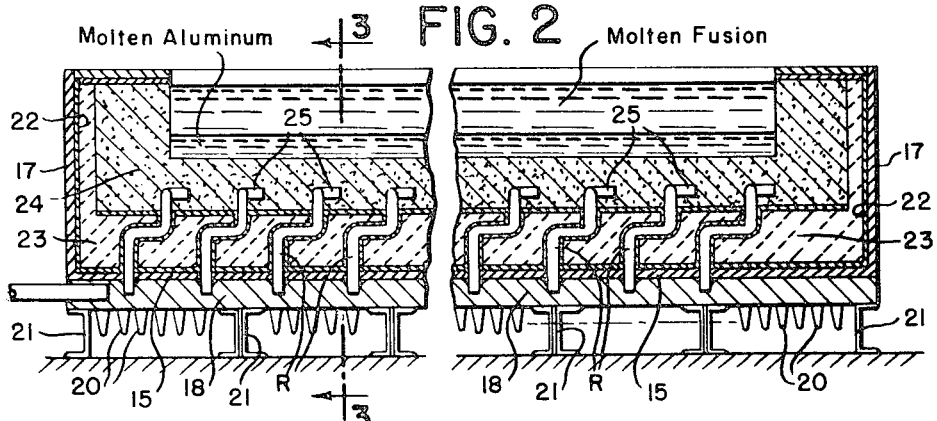
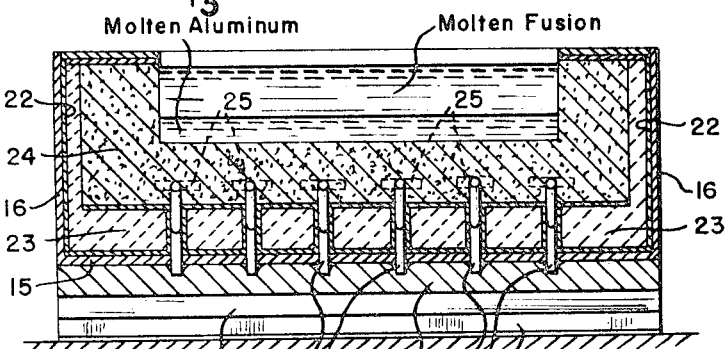
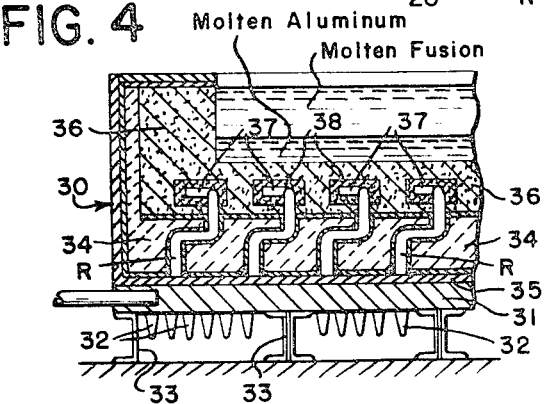
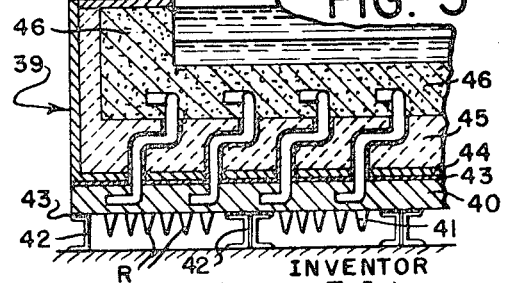
INVENTOR
Arthur F. Johnson
ATTORNEYS United States Patent Office 3,649,480
Patented Mar. 14, 1972

3,649,480
METHOD OF WITHDRAWING HEAT AND CURRENT FROM MOLTEN ALUMINUM CATHODE ELECTROLYTIC CELLS
Arthur F. Johnson, 203 Creole Lane,
Franklin Lakes, N.J. 07417
Application Jan. 4, 1967, Ser. No. 607,330, now Patent No. 3,434,958, dated Mar. 25, 1969, which is a continuation-in-part of application Ser. No. 528,503, Feb. 18, 1966, now Patent No. 3,434,957, dated Mar. 25, 1969. Divided and this application Feb. 26, 1969, Ser. No. 840,556
Int. Cl. C22d 3/02, 3/12
U.S. Cl. 204—67         3 Claims

ABSTRACT OF THE DISCLOSURE

The electrolytic cell of the invention comprises a steel shell including a bottom and a cathodic slab of aluminum in juxtaposition with respect to the bottom which may be in intimate contact with the bottom or electrically insulated from the bottom with a refractory layer between and a multiplicity of iron current collector rods secured to the steel bottom which rods are in intimate electrical contact with the slab of aluminum and have flexible portions extending upward through a layer of non-rigid thermal insulation into the carbon lining providing means to connect electrically the carbon lining to the aluminum slab. More particularly the iron collector rods are so sized and shaped as by being angularly bent or branched that they provide greatly increased and permanent surface contact where embedded in the carbon lining thus lowering electrical contact resistance, and are sufficiently yielding where embedded in the thermal insulation that they permit heaving of the carbon lining without impairing the electrical circuit between the carbon lining and the aluminum slab.

---

This application is a divisional application of copending application, Ser. No. 607,330 filed Jan. 4, 1967, now Pat. No. 3,434,958, which is in turn a continuation-in-part of application Ser. No. 528,503 filed Feb. 18, 1966, now Pat. No. 3,434,957.

As disclosed in said copending application, the cell steel bottom has a relatively thick slab of aluminum which may be cast over the shell bottom, either inside or outside, and the iron rods are secured to the steel bottom and are so shaped that they cannot be pulled out of the carbon lining. The rods may be of any desired cross-sectional shape, bent or hooked or branched where they are located in the carbon lining. They may also be embedded in pieces of graphite where they are in the carbon lining.

In one embodiment of the invention the aluminum slab is cast inside the steel shell and in contact with the steel bottom. Preferably the rods are first welded to the steel bottom and the aluminum slab is cast in contact with the rods. The rods extend upwardly through a layer of refractory insulation over the aluminum slab and into the carbon lining.

In another embodiment of the invention the aluminum slab is on the underside of the cell bottom and is preferably cast on the outside of the steel shell during the cell fabrication. The collector rods preferably extend through holes in the steel bottom and are welded to the inside of the steel bottom of the shell and project into the aluminum slab in intimately bonded electrical and mechanical contact. When the aluminum slab is cast outside the shell bottom, it is advantageous to provide thin aluminum vanes to the slab for dissipating heat. This may be done conveniently during manufacture by placing the shell upside down and pouring the molten aluminum slab thereon with the aluminum vanes suitably supported and chilled so that their edges bond with the slab.

When the current is withdrawn from the aluminum cathode slab bonded firmly to the steel shell the electric current may seek a short circuit through the upper parts of the steel shell where molten aluminum contacts unprotected areas. It is accordingly important that all areas of the inside of the steel shell be coated with a suitable thin refractory which will resist penetration until the fusions freeze in any fissures which may develop.

An important advantage of this invention is that cathode current may be withdrawn at any convenient point or points of the aluminum slab on the cell bottom and without making any holes in the shell if the aluminum slab is exterior to the steel shell. Thus entrance of oxidizing air is prevented.

Another important advantage of this invention is that the rods having flexibility may be conveniently hooked into larger diameter pieces of graphite which are in turn embedded in the carbon lining. The graphite protects the iron rod ends from molten aluminum in fissures which inevitably develop in the carbon lining and this extends the electrical contact surface of the collector without increasing exposure to molten metal in the fissures. Due to the flexibility of the rods and their being hooked into the graphite pieces, the electrical contacts are not broken by heaving of the carbon lining. Likewise the rods if made in flat shapes to increase flexibility in bending and of greater contact surface with the carbon lining may have an indented surface as by corrugations or "waffle-iron" pattern, these having higher contact conductivity. The higher conductivity is maintained because of the multiplicity of rods and their individual flexibility to local heaving movements and local relatively small thermal expansions over relatively small contact surfaces. Furthermore, the permanence of electrical connection of a great multiplicity of rods provides even current and heat withdrawal from the carbon lining to the aluminum slab since each individual iron rod tends to regulate the current flow in its respective area because iron greatly increases in electrical resistance with temperature.

These and other novel features of the invention will be better understood after considering the following discussion and accompanying drawings in which:

FIG. 1 is a longitudinal vertical cross-section of one portion of an aluminum reduction cell of the invention;

FIG. 2 is a longitudinal vertical section of another aluminum reduction cell of the invention;

FIG. 3 is a vertical sectional view at 3—3 of FIG. 2;

FIG. 4 is a vertical sectional view of another modification; and

FIG. 5 is a vertical sectional view of still another modification.

The embodiment of the invention in FIG. 1 illustrates an aluminum reduction cell comprising a steel shell having a flat steel bottom 1, upright sides 2 and an inwardly disposed reinforcing rim 3, commonly known as a deck plate. An aluminum slab 4, in juxtaposition with respect to the bottom, is cast inside the shell on the bottom of the steel shell bottom. The steel or iron collector rods R are preferably welded to the inside of the steel shell. After the aluminum slab is cast over the bottom and in intimate contact with the collector rods therein, a layer of porous refractory 5 such as granular alumina is placed over the aluminum slab and may be packed as by vibration around the collector rods. This refractory must be thick enough to give the cell operation a satisfactory thermal balance consistent with the operation, and is usually 2 to 10 inches, preferably at least 4 inches, thick. This thickness will permit one or more bends to be made in the collector rods R where they pass through the refractory layer to give it mechanical flexibility in case the carbon mass tends to heave. The collector rods R illustrated have branched or hooked upper ends 6 in the carbon lining 7 to securely anchor them in the carbon which is usually rammed into the cell with pneumatic rammers as a carbon paste mixture of pitch and calcined anthracite coal and later baked in place just prior to electrolysis. Prebaked carbon cathode lining blocks may be used with this invention by embedding one or more collector rod portions in the bottom of each block and subsequently welding these rod portions to corresponding rod portion mates projecting from the cell bottom. The refractory 5 is poured or laid in place as each transverse row of prebaked potlining block and their rods are positioned and secured.

It is beneficial to use a dense refractory layer 9 such as a refractory coated paper or paint such as "Carbofrax" or sodium silicate containing refractory pigments between the porous thermal insulation 5 and the carbon lining 7. Such dense refractory is preferably used on the rods R where they pass through the thermal insulation 5. Likewise a thin layer of this dense refractory 9 is highly desirable over the entire inside surface of all the metal walls of the steel shell because this inhibits tap-outs of the molten fusions through unavoidable fissures in the carbon lining. In addition to the thermal insulation 5 on the bottom a similar layer 10 of insulation, for example 2 inches thick, may be used on all the inside walls of the steel shell. This thermal insulation assists the thin refractory 9 to protect the steel shell against penetration by fusions simply by keeping the shell cooler so the fusions freeze before penetrating the thin refractory.

It will be apparent that this invention eliminates the conventionally used complex arrangement of lateral electrical bus bars and flexible connections with conventional horizontal iron collector bars, and provides a very simple cathode connection to the direct current power supply when may be via the next succeeding cell in a potline series of 100 or more cells. To this end a cathode bus 11 in FIG. 1 projecting through a slot in the steel shell is connected by casting or welding to the aluminum slab 4.

The modification of cell shown in FIGS. 2 and 3 has a steel shell consisting of a bottom 15, sides 16 and ends 17. The collector rods R pass through holes in the bottom 15 and are welded thereto. The aluminum slab 18, in juxtaposition with respect to the bottom, is below the bottom 15 and the collector rods extend into the slab. The aluminum slab is cast over the steel bottom while it is in an upside-down position and is accordingly bonded not only to the steel bottom but to the projecting iron rods R. The aluminum vanes 20 depending from the bottom may be sized according to the air velocity available to remove heat most efficiently to keep the slab 18 in the temperature range of 400 to 200° F. or less. The slab rests on a number of I-beam supports 21. As in FIG. 1, the steel shell is lined or coated with the dense refractory 22. A layer of refractory alumina 23, 2 to 10 inches thick, is rammed over the bottom and into contact with the collector rods. These rods and the upper surface of the refractory are also coated with the refractory 22. Where the rods extend through the refractory layer 23 and into the carbon cathode lining 24 they are bent or branched to provide a hooked effect. The upper ends may have several lateral arms 25 to give increased electrical contact and more effective anchorage.

The variation of the invention shown in FIG. 4 is like the cell of FIGS. 2 and 3 comprising a steel shell 30, an aluminum slab 31 with fins 32, in juxtaposition with respect to the steel bottom, the slab supporting the cell on I-beams 33. A layer of granular alumina refractory 34 is interposed between the shell bottom 35 and the carbon cathode lining 36. As in FIGS. 1 to 3, a coating or layer of dense refractory may be applied over the inner surfaces of the shell and also over the collector rods R where they pass through the refractory layer 34.

In this variation of the invention, the rods R are welded to the inner surface of the steel bottom 35 and the hooked or branched ends 37 of the rods are embedded in blocks of graphite 38. These blocks are in intimate contact with the carbon cathode lining which is formed around the blocks in constructing the cell.

The variation shown in FIG. 5 is generally like the cell of FIGS. 2, 3 and 4 comprising a steel shell 39, the aluminum slab 40 with fins 41, in juxtaposition with respect to the shell bottom, I-beams 42 but insulated electrically therefrom by a thin refractory insulation 42. This juxtapositioned aluminum slab is electrically insulated from the bottom 44 of the steel shell with a thin layer of refractory insulation 43. The thin refractory covers the current collector rods R not only where the rods pass through the granular alumina or other heat insulation 45 but also where the rods pass through oversize holes in the steel bottom of the shell. As in FIGS. 1 to 4 the rods are hooked into the carbon cathode lining 46. The holes in the steel bottom of the shell are made large enough so that the rods can be passed through the holes even with the bends shown already in the rods. Then the thin refractory is applied to the rods together with a refractory cement or grout which hardens so that the holes are sealed gas tight and remain so. The aforementioned cell is preferably constructed with its coating of refractory 43 inverted so that the aluminum slab 40 and its fins 41 can be poured on top of the refractory on the inverted shell. This casting of the aluminum results in anchoring the rods so that they cannot be pulled out of the aluminum slab and the firm attachment of the aluminum slab to the cell bottom. As previously described the rods R have hooks on the ends and cannot be pulled out of the carbon cathode lining so a very stable electrical connection is established between. In this variation the inside walls and bottom of the steel shell 39 may or may not be covered with a layer of the thin refractory 43. In FIG. 5 no thin refractory is shown lining the steel shell as it is already insulated from the aluminum slab as shown so that there will be no tendency for an electrical short circuit if molten aluminum breaks through a crack in the cathode carbon lining and penetrates to the inside of the steel shell. However, it is good practice to cover the insides of the steel shell with thin refractory as in FIGS. 1 to 4 even when utilizing the variation of FIG. 5 because the shell is protected against the chemical attack of the molten aluminum and doubly protected against electrical short circuit which combined with molten metal can eat through a steel shell very quickly by electrically superheating and electrically stirring the molten metal stream.

The varation of FIG. 5 does not require welding of the rods to the steel shell in order to anchor them which is accomplished by hooking them in the aluminum slab which thereby makes unnecessary the intimate electrical bonding or contacting of the steel shell bottom and the aluminum slab shown in FIGS. 1 to 4. Advantageously no molten aluminum can escape out through the holes in the bottom 44 nor may air enter in through said holes since the thin refractory and refractory paste grout used therewith fills all crevices between the steel shell and the rods passing through it and the aluminum slab upon which it is superimposed.

The vertically disposed collector bars of the invention permit very large reduction cells of 200,000 amperes or greater to be built with assurance that the cathode current and heat will be uniformly extracted over the bottom of the cathode since all collector rods are advantageously of uniformly short length, the collector rods by being firmly anchored at the top end to the carbon cathode bottom and below to the steel bottom will not easily become detached by the forces of heaving the carbon cathode. Moreover, the flexibility of the rods due to the bends therein prevent undue stress being placed in the carbon cathode as it tends to heave. The freedom from holes in the steel shell prevents the entrance of air which may oxidize and deteriorate the carbon lining during its operating life. Likewise the freedom from holes in the steel shell avoids tap-outs therethrough of the molten fusions.

In the use of an aluminum reduction cell of the type described herein, or in my aforesaid pending patent application of which this is a continuation, a radically improved process of reduction results. To fully appreciate the improvement it is important to perceive that in conventional reduction cells where current is withdrawn edgeways from the carbon lining of the cell with horizontal collector bars much of the current is consequently carried sideways in the relatively highly conductive molten metal pad, which underlies the fused electrolyte. Much of the current travels only in the portions of the carbon lining and in the ends of collector bars nearest the cell sides since the molten metal is a better electrical conductor than either the carbon lining or the iron collector bars. In effect the inner area of carbon lining in conventional cells is of little value as an electrical conductor of cathode current, and merely protects the huge iron collector bars from the corrosive molten aluminum and fused electrolyte.

This invention, which draws the current downward through substantially vertical, and less massive collector bars, reduces the electrical resistance through the cathode carbon to perhaps one-half or one-quarter what it is in conventional cells, which withdraw current horizontally edgeways, simply because cell dimensions range in width from about 8 to 15 feet and length about 20 to 25 feet, whereas the carbon lining thickness from the molten metal to the collector bars usually ranges from about 8 inches to 16 inches. Accordingly this invention not only provides less electrical loss through the linings by current passing broadside rather than edgeways, but, much more importantly, it eliminates the tendency for current to travel sideways horizontally in the molten metal pad. This is an important improvement because it is well known such currents in the molten metal pad cause electromagnetic circulation of the molten metal and metal heaping at almost unpredictable times and places depending on many factors so that anode-cathode spacing is affected making endless laborious adjustment of anodes necessary and efficiency of the conventional process poor compared to that attainable by this invention. Thus the process employed by this invention of withdrawing downward electricity, and incidentally heat, relatively uniformly from each horizontal unit cross section of the molten metal pad into a common heat and electrical sink such as a heavy aluminum slab incorporated in the bottom shell supporting the cathode carbon results in more stable and efficient cell operation and longer life of the carbon linings.

Many prior attempts have been made to gain the above outlined advantages by withdrawing current vertically downward but these have not been commercially successful on a sustained basis for various reasons. In some cases they involved making sliding fits of the collector bars through holes in the bottom of the furnace and air entered thereby burning up the carbon lining of the cell or molten aluminum. In other cases the collector bars were not connected to a heavy slab of aluminum or copper on the bottom of the cell so that a sink, or equipotential repository for heat and electricity, was provided to keep heat and electricity flowing uniformly downward through the cell as provided by this process. In still other cases no means was provided for the collector bars to flex with the movements in the carbon potlining so that during operations said collectors might be pulled out of electrical connection therewith by heaving of the potlining.

Where carbon lining is used in this specification it will be understood to include such other conductive non-carbonaceous or partly carbonaceous linings.

I claim:

1. In the electrolytic reduction of aluminum in a fused electrolyte underlain by a molten aluminum pad forming the cathode the process improvement which comprises withdrawing current and also heat substantially uniformly at locations extending over at least most of the area of the molten aluminum cathode into a cooled aluminum slab which lies spaced from the molten cathode.

2. The improvement according to claim 1 wherein the current and heat is withdrawn downwardly from the molten aluminum cathode into a cooled aluminum slab which lies spaced beneath the molten cathode.

3. In the electrolytic reduction of aluminum in a fused electrolyte underlain by a molten aluminum pad forming the cathode the process improvement which comprises withdrawing current and also heat substantially uniformly downward in electrically separate paths at a plurality of spaced locations extending over at least most of the area of the molten aluminum cathode into a cooled aluminum slab which lies parallel to and horizontally beneath the molten cathode.

References Cited

UNITED STATES PATENTS

| 816,764 | 4/1906 | Valentine et al. | 204—244 X |

FOREIGN PATENTS

| 473,043 | 9/1914 | France | 204—67 |
| 38,159 | 10/1923 | Norway | 204—243 |

HOWARD S. WILLIAMS, Primary Examiner

D. R. VALENTINE, Assistant Examiner

U.S. Cl. X.R.

204—243